Figure 1:
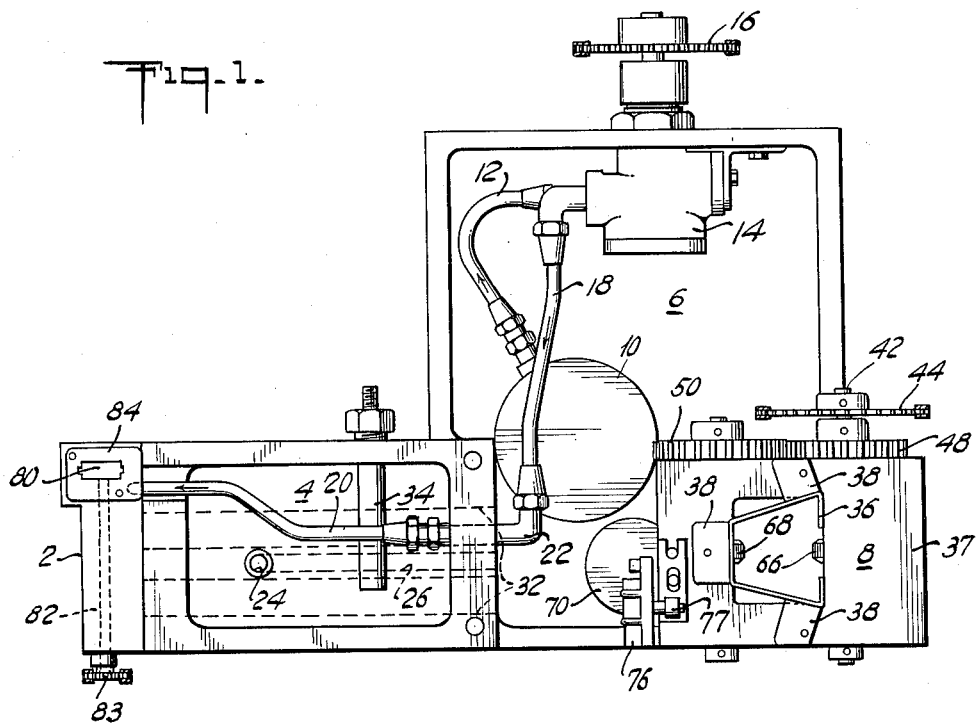

June 20, 1961 T. P. GARDNER 2,989,028
APPARATUS FOR APPLYING SEALING MATERIAL
Filed Aug. 27, 1957 3 Sheets-Sheet 1

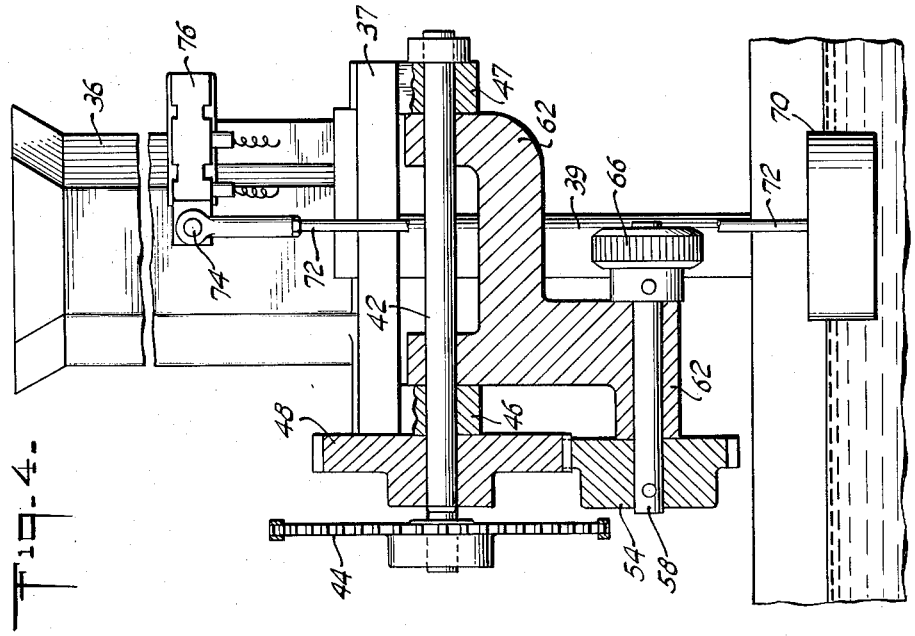
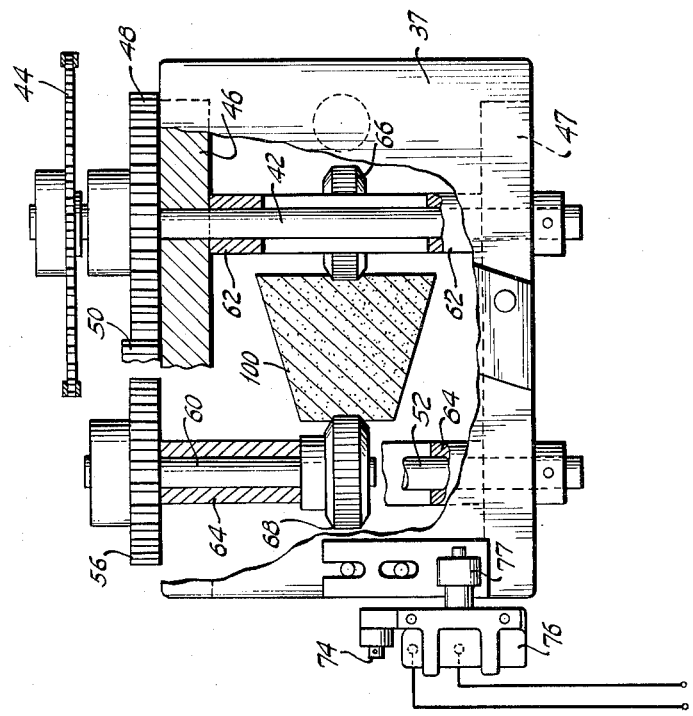

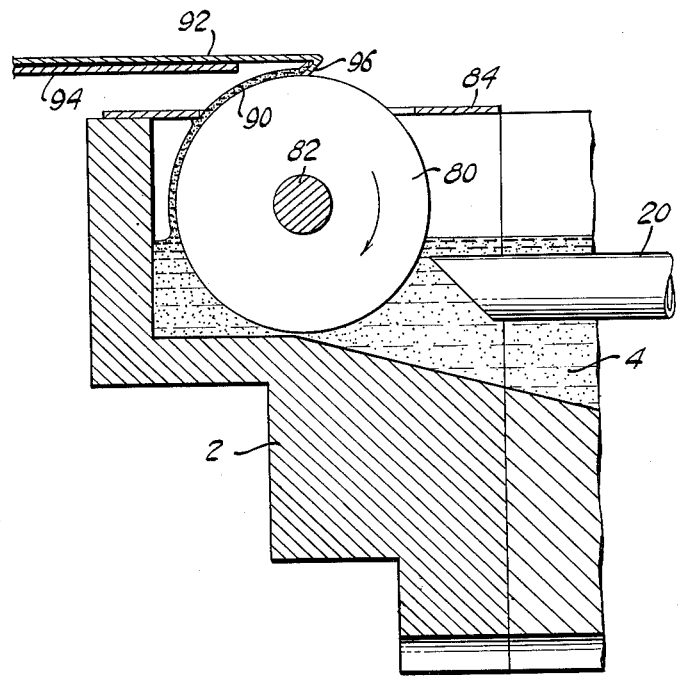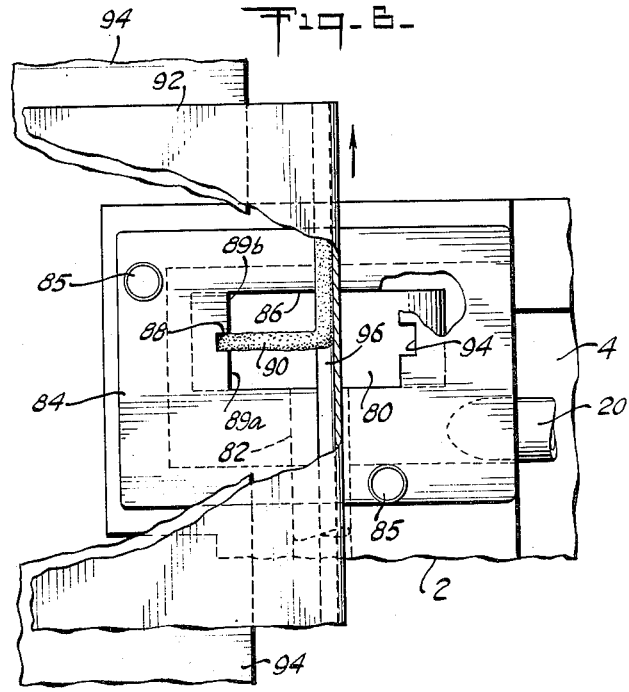

United States Patent Office 2,989,028
Patented June 20, 1961

2,989,028
APPARATUS FOR APPLYING SEALING MATERIAL
Thomas P. Gardner, Port Arthur, Tex., assignor to Texaco Inc., a corporation of Delaware
Filed Aug. 27, 1957, Ser. No. 680,577
2 Claims. (Cl. 118—602)

This invention relates to a method and apparatus for applying sealing cement to the side seam of a can blank. More particularly, it relates to a method and apparatus for applying in uniform and controlled amount of sealing cement to a hooked flange formed along the side of a can blank during the process of forming the can body.

Numerous devices and methods of applying sealing material to containers have been proposed and a number of these are used with varying degrees of satisfaction. In the canning art, some problems are met which are common to other packaging arts and other problems are encountered which are peculiar to the canning art alone. Probably the greatest problem in the manufacture of leak-proof cans is that dealing with forming can seams having uniform and controlled amounts of sealing material applied prior to completion of the seam. It is extremely important that exactly the right amount of cement be provided since too much or too little results in an unsatisfactory seam. Other problems are also involved. For example, the sealing material or cement most commonly used in the manufacture of cans is supplied in solid stick form and must be melted down for use in the liquid state. An apparatus which will automatically supply the solid cement to the melting means when needed is a development problem more or less common to all package-forming arts utilizing solid cement.

More critical in the canning art than in other package-forming arts are the problems of providing liquid cement to the applicator at a specified uniform temperature and in a sufficiently uncontaminated condition.

The above-mentioned problems and others are met by the present invention which includes a method of applying liquid cement to the side seam of a can blank comprising forming a hooked flange on a side of said can blank, continuously forming a narrow bead of cement on the periphery of a moving applicator wheel, and moving the free end of said hooked flange across the periphery of said moving wheel in a direction substantially parallel to the axis of said wheel, said flange portion being in a proximate relationship to the periphery of said wheel whereby the bead of cement is transferred to said flange, said can blank extending in a direction opposite to the rotation of said wheel. Both the applicator wheel and can blank are moved at a constant speed in order to obtain a continuous uniform bead along the flange.

This invention also includes an apparatus for applying a sealing cement to a hooked flange of a can blank comprising a fluid cement applicator, a fluid cement reservoir for supplying cement to said applicator, a melting pot to bring said cement to the liquid state, a fluid conducting means from said melting pot to said reservoir, fluid filtering means connected to said conducting means, and means to return superfluous cement from said reservoir to said melting pot. In the preferred embodiment of the apparatus, electric heating means are employed as a heat source in the melting pot. Electric heating means are also included to supply heat to the reservoir to provide fluid cement at a uniform temperature. Pumping means are incorporated to bring the fluid cement from the melting pot into the reservoir. In the preferred embodiment, the cement is conducted through the reservoir below the liquid level to a point adjacent the applicator. Gravity return means are preferably provided to bring the superfluous cement back to the melting pot from the reservoir.

The applicator used with the present device comprises a driven wheel member mounted on a horizontal axis and having its lower portion submerged in the cement in the reservoir. Means are provided to form a continuous bead of cement on the periphery of said wheel member as the periphery rotatably emerges from the cement in said reservoir. The bead forming means generally comprises a wiper member having two wiping elements contacting a portion of the periphery of said wheel. The wiping elements define the sides of an opening or aperture in the wiper which allows a desired portion of cement on the periphery to pass through to form a continuous bead. The size of the opening determines the size of the bead formed on the periphery of the wheel. Wiping means may advantageously be provided for the sides of said wheel to prevent it from carrying and throwing excess cement in the direction of rotation.

This invention also includes means, in combination, for automatically supplying solid cement in stick form to the melting pot in response to the liquid level in said melting pot. Said means comprises feed rolls positioned on opposite sides and capable of gripping the cement in solid stick form, power means to drive said feed rolls, control means to actuate said power means in response to the liquid level in the melting pot. The power means is preferably electrically operated and controlled by a mercury switch or the like operatively connected to float means in the fluid cement in the melting pot.

Figure 2:
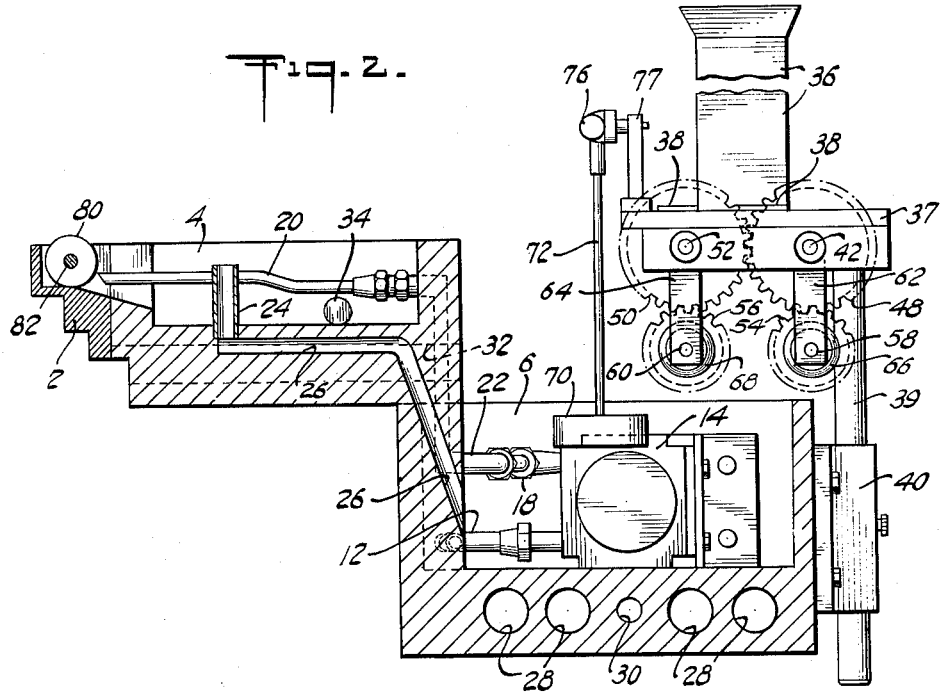

A complete understanding of the invention will be attained by referring to the following specification and attached drawings in which FIG. 1 is a top plan view of the apparatus of the invention; FIG. 2 is a side-sectional view of FIG. 1; FIG. 3 is a sectional view of the stick feed mechanism; FIG. 4 is a side partial-sectional view of the stick feed mechanism; FIG. 5 is a partial-sectional view of the applicator wheel, wiper member and a portion of the cement reservoir; and FIG. 6 is a top view of the wiper member and applicator wheel including a broken view of a can blank moved across the periphery of the wheel.

The size of the opening determines the size of the bead tion consists of several main parts. These parts include the applicator broadly designated as 2, the cement reservoir 4, the melting pot 6 and the stick feed 8.

In FIGS. 1 and 2 the melting pot 6 is shown to include a strainer 10 (not shown in FIG. 2) through which the liquid cement is passed by suction. The liquid cement which passes through strainer 10 proceeds through line 12 through suction pump 14 operated by a motor (not shown) which drives gear 16. The fluid cement continues from pump 14 through line 18 into the reservoir 4 by way of line 20 coupled to line 18 by means of elbow coupling 22. Line 20 is positioned to be below the normal liquid level of the reservoir 4. The normal liquid level of reservoir 4 is maintained by the height of overflow standpipe 24. Standpipe 24 receives the superfluous liquid in reservoir 4 and returns it by way of duct 26 to melting pot 6.

The temperature of the melting pot 6 is controlled by four electric heater elements (not shown) inserted in holes 28. The input from these heaters is controlled by a thermoswitch (not shown) in smaller hole 30. The temperature of the reservoir 4 is controlled by heating elements (not shown) inserted in holes 32 and the input from these heating elements is controlled by a thermoswitch 34.

The stick feed mechanism broadly designated as 8 is mounted at a corner of melting pot 6 so that cement stick chute 36 is positioned to supply the cement stick to the melting pot as needed. The chute 36 is fastened to a platform 37 by means of flanges 38. Platform 37 is held at the desired height by rod 39 adjustably mounted in holder 40 which is secured to the side of melting pot 6. As seen in FIGS. 3 and 4, a drive shaft 42 having gear 44 secured at the end thereof, is mounted for rotation in bearing plates 46 and 47 just below the platform 37. Gear 44 is ordinarily chain driven by a motor (not shown). Gear 48, securely mounted for rotation on shaft 42, drives gear 50 mounted on shaft 52. Gears 48 and 50, drive the lower smaller gears 54 and 56, respectively. Gears 54 and 56 are mounted on shafts 58 and 60, which in turn are mounted in support members 62 and 64, respectively. Support members 62 and 64 are pivotally mounted on shafts 42 and 52. Serrated feed rolls 66 and 68 are mounted at the opposite ends of shafts 58 and 60 from gears 54 and 56. Driven gears 54 and 56, drive shafts 58 and 60 and, consequently, feed rolls 66 and 68 in opposite directions. The feed rolls 66 and 68 grip the opposite sides of the solid cement in stick form 100 which has been inserted in chute 36. When said roll 66 is moved clockwise and concurrently, feed roll 68 moves counter-clockwise, the stick cement will be moved downwardly into the melting pot 6.

A float member 70 is suspended by means of rod 72 and attached at 74 to a mercury switch 76 which is pivotally mounted at 77 on platform 37. The float 70 is adapted to ride on or about the surface of the liquid in melting pot 6 and any upward or downward movement of the liquid level will be transferred through rod 72 to pivot the switch 76. Thus when the liquid level of melting pot 6 begins to recede, the downward movement of float 70 will activate switch 76 to start the motor (not shown) which chain drives gear 44 to eventually turn the feed rolls 66 and 68 to supply the stick cement to the melting pot 6. When the liquid level in the melting pot has again reached the desired level, the float 70 rising with the liquid level will cause mercury switch 76 to cut the power to the motor thus stopping the downward movement of the cement stick in chute 36.

The applicator seen in more detail in FIGS. 5 and 6, is broadly designated as 2 and consists of an applicator wheel 80 mounted on horizontal shaft 82 so that the lower portion of the wheel is immersed in the melted cement in the extended portion of reservoir 4. A wiper plate or member 84 is mounted over the wheel 80 and securely fastened at 85. The wiper plate has an opening 86 which fits closely to the sides and periphery of the wheel 80. At one side of the opening 86 a small aperture 88 is provided to allow a portion of cement to be carried by the periphery of the wheel so that a continuous bead 90 of cement is formed thereon. The aperture 88 is defined by wiping elements 89a and 89b which contact a portion of the periphery of the wheel 80. The wheel 80 is rotated by means of shaft 82 having sprocket 83 mounted at an end thereof, as shown in FIG. 1, which is chain driven by a motor (not shown). As the wheel 80 is rotated, a portion of liquid cement is picked up from the reservoir on the periphery and sides thereof. The cement on the sides and a portion of the periphery of the wheel is wiped or scraped therefrom by means of a wiper member 84 except for that portion on the periphery passing through the aperture 88. As wheel 80 continues to rotate, the cement passing through aperture 88 in the form of a continuous bead 90 is deposited within the hooked flange of can blank 92 as it passes in a direction substantially parallel to the axis or shaft 82 of wheel 80. The wiper plate 84 has another aperture 94 in a side of the opening 86 opposite to the side having aperture 88. This larger aperture 94 is provided to allow any superfluous cement, which is left on the wheel after that portion of the periphery passes the flange of can blank 92, or when no can blank is passing over the wheel to pass back to the reservoir 4 without clogging or collecting on the surface of the wiper member 84. That portion of the wiper member 84 which fits closely to and wipes the side of the wheel 80 is very desirable but not necessary to this invention.

In the operation of the side seam cement applicator of the invention a stick or bar of solid cement 100 having a cross sectional area similar to that of chute 36 is inserted in said chute and grasped by serrated drive rolls 66 and 68 which move the cement stick 100 downwardly into melting pot 6 whereupon the solid cement stick is gradually melted from the heat supplied by the heating elements in holes 28. When enough of the solid cement stick 100 has been melted to raise float 70 so that mercury switch 76 causes the motor driving gear 44 to stop, the descent of the cement stick 100 is discontinued. After the initial filling of the melting pot, the consumption of cement in the operation of the apparatus is the only factor controlling the cement stick feed rate.

The pump 14 operated by the motor driven gear 16 pulls the melted cement through strainer 10 and up into reservoir 4 through lines 12, 18, and 20. Strainer 10 is essential to maintain a pure liquid in reservoir 4 since impurities such as specks of dirt, grit or small pieces of tin in the cement may cause leakage in the cam seams. The line 20 extends through reservoir 4 and is positioned just below the surface of the liquid to help maintain a uniform temperature of the cement in the line. The outlet of line 20 is adjacent the applicator wheel 80 which insures a continuous hot supply of liquid cement near the applicator wheel at all times. Since it would be difficult to maintain a uniform fluid temperature in the melting pot itself owing to the periodic insertion of the solid cement, the reservoir 4 having heating elements inserted in holes 32 is provided to supply a liquid cement having the desired uniform temperature to the applicator wheel 80. It also serves as a collecting or storage means for the purified cement passing through strainer 10 and to maintain a constant fluid level near the applicator wheel.

The liquid from melting pot 6 is passed through reservoir 4 by pump 14 at a rate faster than that at which the cement is applied to the cam blanks by the applicator wheel 80; consequently, reservoir 4 will overflow into standpipe 24 and return to the melting pot 6. This arrangement assures a constant supply of cement to the applicator wheel 80 and relieves the operator from the necessity of checking the liquid level in the reservoir 4.

The applicator wheel 80 is turned or rotated at a constant speed by motor driven gear or sprocket 83. Moving feed fingers 94 carry can blank 92 across the applicator wheel 80 at a constant speed. Can blank 92 is positioned on feed fingers 94 so that the free end 96 of the hooked flange of can blank 92 is moved across the periphery of the applicator wheel 80 substantially perpendicular to and in a proximate relation thereto. The can blank 92 is moved in a direction substantially parallel to the axis or shaft of applicator wheel 80. This arrangement allows the bead of cement 90, formed when the cement on the applicator wheel passes through aperture 88, to be transferred to the hooked flange 96 in a uniform amount.

Obviously many modifications and variations of the invention as hereinbefore set forth, may be made without departing from the spirit and scope thereof, and therefore, only such limitations should be imposed as are indicated in the appended claims.

I claim:

1. An improved side seam cement applicator having a fluid cement reservoir, a rotary fluid cement applicator wheel partially immersed in fluid cement in said reservoir, a wiping member having an opening through which said wheel projects with opposite pairs of edges defining said opening in close contact with the ends and the projecting periphery of said wheel and with one of said edges defining said opening having a pair of wiping elements contacting a portion of said projecting periphery of said wheel whereby fluid cement picked up on the periphery of the rotating applicator wheel remains as a continuous narrow bead of cement thereon, and means for maintaining automatically said fluid cement in said reservoir at a constant level including a pot for melting solid cement and for maintaining melted cement in liquid form including heating means associated with said pot, means for pumping and filtering fluid cement positioned in said fluid cement in said pot, conduit means joined to and leading from said means for pumping and filtering and ending adjacent said wheel in said reservoir thereby to provide a continuous supply of hot fluid cement, overflow means for gravity return of superfluous fluid cement interconnecting said reservoir and the melting pot, and automatic feed means for positioning and providing solid cement to said melting pot including a prime mover therefor, switch means to control the operation of said prime mover, liquid level responsive means joined to said switch means and positioned in said pot for activating said switch means in response to changes in the level of fluid cement in said pot, said feed means including a chute for receiving solid cement and cement gripping rolls positioned on opposite sides of said chute, said prime mover driving said rolls.

2. Means for the automatic maintenance at a constant level of fluid cement in a reservoir wherefrom a rotary fluid cement applicator wheel applies cement to a side seam comprising, in combination therewith, means for melting cement provided in solid stick form and for maintaining cement in fluid form including a melting pot and heating means associated therewith, means located in said melting pot for filtering and pumping filtered fluid cement therefrom, conduit means joined to said last mentioned means and leading therefrom and ending adjacent the applicator wheel in said reservoir below the fluid level therein whereby a continuous supply of hot fluid cement is provided to said reservoir, fluid level control means including a stand pipe for the gravity return of superfluous fluid cement to said melting pot interconnecting said reservoir therewith, and means for automatically providing cement in solid stick form to said melting pot including a chute for receiving the solid cement, feed rolls positioned on opposite sides of said chute adjacent the bottom thereof for gripping said solid cement therein, control means for the operation of said feed rolls including a prime mover and a switch therefor, and means responsive to the fluid level in said pot joined to said switch for operation of the same as the level of fluid cement in said melting pot changes.

References Cited in the file of this patent

UNITED STATES PATENTS

| | | |
|---|---|---|
| 1,192,380 | Brackett | July 25, 1916 |
| 1,822,466 | Valdes | Sept. 8, 1931 |
| 2,344,303 | Henchert | Mar. 14, 1944 |
| 2,651,586 | Cooper | Sept. 8, 1953 |
| 2,773,280 | Albright | Dec. 11, 1956 |
| 2,787,241 | Kelley | Apr. 2, 1957 |